United States Patent
Fowler

[11] Patent Number: 5,870,056
[45] Date of Patent: Feb. 9, 1999

[54] AIR-TO-AIR PASSIVE LOCATION SYSTEM

[75] Inventor: Mark L. Fowler, Ithaca, N.Y.

[73] Assignee: Lockheed Martin Corporation, Bethesda, Md.

[21] Appl. No.: 760,742

[22] Filed: Dec. 5, 1996

[51] Int. Cl.⁶ .................................................. G01S 5/02
[52] U.S. Cl. ........................ 342/424; 342/442; 342/156
[58] Field of Search .................................. 342/417, 418, 342/442, 424, 156

[56] References Cited

U.S. PATENT DOCUMENTS

| | | | |
|---|---|---|---|
| 4,350,984 | 9/1982 | Fisher | 343/112 |
| 4,509,052 | 4/1985 | Cash | 343/418 |
| 4,613,867 | 9/1986 | Golinsky | 343/458 |
| 4,728,958 | 3/1988 | Choate | 342/424 |
| 4,734,702 | 3/1988 | Kaplan | 342/424 |
| 4,788,548 | 11/1988 | Hammerquist | 342/458 |
| 4,942,404 | 7/1990 | Kefer | 342/418 |
| 5,165,051 | 11/1992 | Kumar | 324/79 D |
| 5,343,212 | 8/1994 | Rose et al. | 342/424 |
| 5,406,291 | 4/1995 | Guerci et al. | 342/451 |
| 5,457,466 | 10/1995 | Rose | 342/442 |

Primary Examiner—Theodore M. Blum
Attorney, Agent, or Firm—Glenn W. Bowen

[57] ABSTRACT

A system is disclosed for estimating the position and velocity of a moving transmitter making use of both Doppler frequency measurements and LBI phase measurements. The frequency measurements and the LBI phase measurements are made from a platform moving through said measurement path. The estimation is based on equation models $$f = f_o - \frac{f_o}{c} \Delta V \cos\theta_f,$$

$$\phi = \left[ \phi_o + \frac{2\pi L}{\lambda} \cos\theta_\pi \right] \mod 2\pi.$$

These equation models are used in cost evaluations in grid searches to provide initial estimates of parameters defining the position and velocity of the transmitter and the initial estimates are used in nonlinear least squares calculations based on the equation models to provide an estimate of the position and velocity of the transmitter.

11 Claims, 11 Drawing Sheets

INITIALIZATION BLOCK DIAGRAM

AIR-TO-AIR PASSIVE LOCATION SYSTEM

This invention relates to a system for estimating the position and velocity of a moving airborne transmitter from a moving airborne platform using a long baseline interferometer (LBI) and Doppler measurements.

BACKGROUND OF THE INVENTION

Various techniques exist for estimating the position and velocity of a moving transmitter based on passive measurements made by a moving sensor. Some of these techniques rely on combining measurements from several types of sensors, e.g., optical, electromagnetic, and acoustic. Some also require a plurality of platforms, each equipped with its own sensor or set of sensors. Such limitations restrict the applicability of these techniques. The prior art also includes a series of three techniques that allow the estimation of the position and velocity of a moving transmitter provided that the transmitter is traveling linearly at a constant velocity and that the sensor's motion is constrained to match some a priori trajectory. U.S. Pat. No. 4,179,697 discloses a method applicable when the sensor is constrained to be moving along a known curved trajectory at a constant speed. U.S. Pat. No. 4,558,323 discloses a method applicable when the sensor is constrained to be moving along a linear trajectory at a non-constant speed. U.S. Pat. No. 4,613,867 discloses a method applicable when the sensor is constrained to be moving along a linear trajectory at a constant speed. The first two of these methods use passive bearing measurements made while the sensor traverses its constrained trajectory. The third method uses passive frequency measurements and passive bearing measurements made while the sensor traverses its constrained trajectory. Yet another method, as disclosed in U.S. Pat. No. 4,788,548, exploits the curvature of the received signal's wavefront to estimate a moving or stationary transmitter's position; however, it is incapable of estimating the transmitter's velocity.

The present invention provides a method that removes the limitations and constraints of the methods of the prior art.

SUMMARY OF THE INVENTION

In the air-to-air passive location system of the invention, the moving transmitter's position and velocity are estimated using measurements of the received signal's frequency and LBI phase differences taken as a single two-antenna sensor traverses an arbitrary trajectory. The position and velocity of a transmitter is determined by making use of the change in frequencies received by the platform caused by Doppler effect and the change in LBI phase differences measured between the LBI antennas.

Copending application Ser. No. 08/731,193 entitled "Doppler Triangulation Transmitter Location System" invented by Steven V. Czarnecki et al., filed Oct. 7, 1996, discloses a system for locating the position of a fixed transmitter in two dimensions from a moving platform by measuring the frequency of the received signal as the platform moves through a measurement path. Copending application Ser. No. 08/731,191, entitled "Self-Resolving LBI Triangulation", invented by Steven V. Czarnecki et al., filed Oct. 7, 1996, discloses a system for locating a fixed transmitter in two dimensions from a platform as the platform moves through a measurement path by the phase difference measurements at two antennas of an LBI sensor as the platform moves through a measurement path. The systems to both of these patent applications are effective at accurately locating the location of a fixed transmitter in two dimensions. However, if it were attempted to expand the systems disclosed in these applications to measure the location and velocity of a transmitter moving in three dimensions, problems would arise. Doppler frequency measurements provide very accurate bearing estimates, but are less effective at providing range and heading estimates of a moving transmitter (the term "heading" as used herein means the direction of motion of the transmitter). On the other hand, LBI measurements provide accurate range and heading estimates, but are less effective at providing accurate bearing estimates. The present invention combines both Doppler and LBI measurements to take advantage of the strengths of both types of measurements to achieve an accurate estimate of the transmitter's position and velocity.

The frequency of the signal received by one of the two LBI antennas as it moves relative to a moving transmitter can be represented in vector notation as follows:

$$f = f_o - \frac{f_o}{c} \left( \overline{\Delta V} \cdot \frac{\bar{r}}{|\bar{r}|} \right), \quad (1)$$

in which f is the detected frequency, $f_o$ is the transmitter frequency being detected, c is the rate of travel of the signal in the transmitting median, i.e., the speed of light in the case of a radio signal, $\overline{\Delta V}$ is the difference between the velocity vector of the sensor and the velocity vector of the transmitter, $\bar{r}$ is the range vector from the transmitter to the antenna. The expression of Equation (1) can be written in scalar form as follows:

$$f = f_o - \frac{f_o}{c} \Delta V \cos\theta_f, \quad (2)$$

wherein $\Delta V$ is the scalar component of velocity vector $\overline{\Delta V}$ that lies along the range vector, and $\theta_f$ is the angle between the range vector and the direction of travel of the antenna.

The measured LBI phase difference corresponds to the angle of arrival of the transmitted signal plus an unknown constant minus an unknown integer multiple of $2\pi$. The measured phase difference (in radians) can be expressed as follows:

$$\phi = \left[ \phi_o + \frac{2\pi L}{\lambda} \cos\theta_\phi \right] \mod 2\pi, \quad (3)$$

in which $\phi$ is the measured phase difference, $\phi_o$ is an unknown constant, L is the length of the baseline of the LBI antenna, $\lambda$ is the wavelength of the transmitted signal and $\theta_{100}$ is the angle of arrival of the transmitted signal relative to the LBI baseline.

In accordance with the invention, the frequency and LBI phase difference detected by the antennas is repeatedly measured as the platform carries the antennas through a measurement path to provide a series of frequency measurements and LBI measurements distributed at measurement points along the measurement path. An inertial navigation system continuously tracks the position and attitude of the platform and from this information, the position, velocity and bore site of each antenna is tracked through the measurement path.

In accordance with the invention, to determine the position and velocity of the transmitter, a cost function is evaluated to select one of a set of trial grid points as the initial estimate of the transmitter's position and velocity. This initial estimate is then refined with a nonlinear least squares convergence using the selected trial grid point as a starting point.

When the transmitted signal is a radar signal, the signal will be in the form of clusters of pulses, each pulse having a waveform at the frequency to be measured. The frequency of the transmitted signal is detected by cross correlating the pulses received at one of the two LBI antennas with the other pulses received at the same antenna that are in the same cluster to determine the elapsed time and the elapsed phase (modulo $2\pi$) between each pair of cross correlated pulses. The frequency is then determined from the elapsed time and phase determinations.

BRIEF DESCRIPTION OF THE DRAWINGS

FIGS. 2, 2A and 2B are flow charts of the computer program used in the system of FIG. 1 to acquire data and compute the estimated location of a transmitter;

FIGS. 7A through 7C are flow charts of the initialization routine;

DESCRIPTION OF A PREFERRED EMBODIMENT

Figure 1:
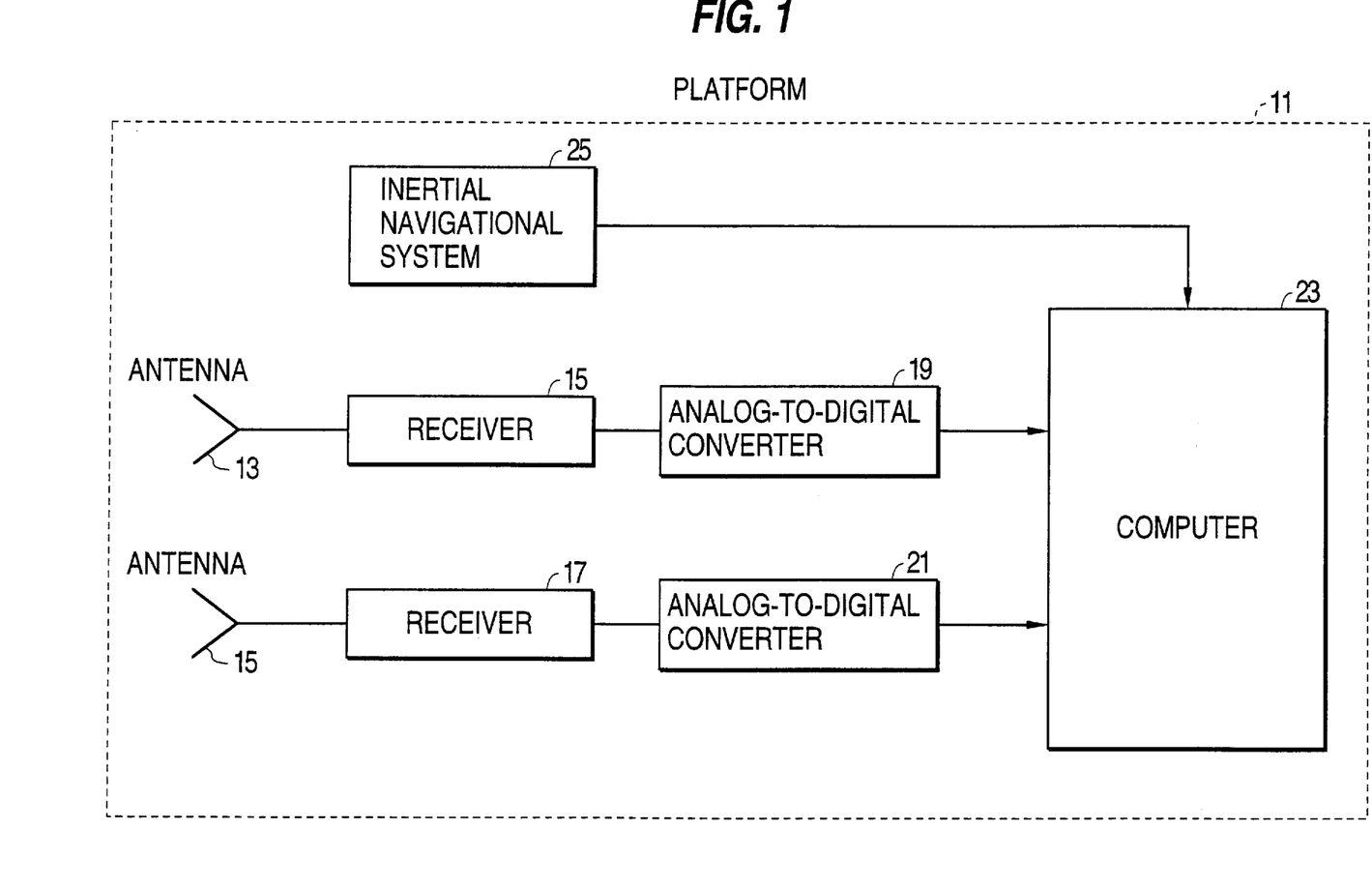
FIG. 1 is a block diagram of the system of the invention.

As shown in FIG. 1, the system of the invention comprises a platform 11, such as an aircraft, on which two antennas 13 and 15 of an LBI sensor are mounted. The platform holds two RF receivers 15 and 17, such as radar receivers, for receiving a transmitted signal and converting the received signals to IF signals, two A-to-D converters 19 and 21 that convert the IF signals to digital values representing amplitudes and phases of successive samples of the IF signals, a computer 23 for computing the transmitter's position and velocity in accordance with the algorithm of the invention, and an inertial navigation system 25 that continuously tracks the position and attitude of the platform. The specific embodiment of the invention represented in FIG. 1 is designed to receive and operate on radar signals varying from 0.5 gigahertz to 20 gigahertz. Each receiver includes a frequency converter making use of a local oscillator to reduce the detected frequency of each received signal to about 160 megahertz. Each receiver also applies a digital signal to the computer representing the local oscillator frequency of the receiver. The digital values representing the phase samples of the pulses may be provided by a phase analog-to-digital converter as disclosed in U.S. Pat. No. 4,405,895.

Figure 2:
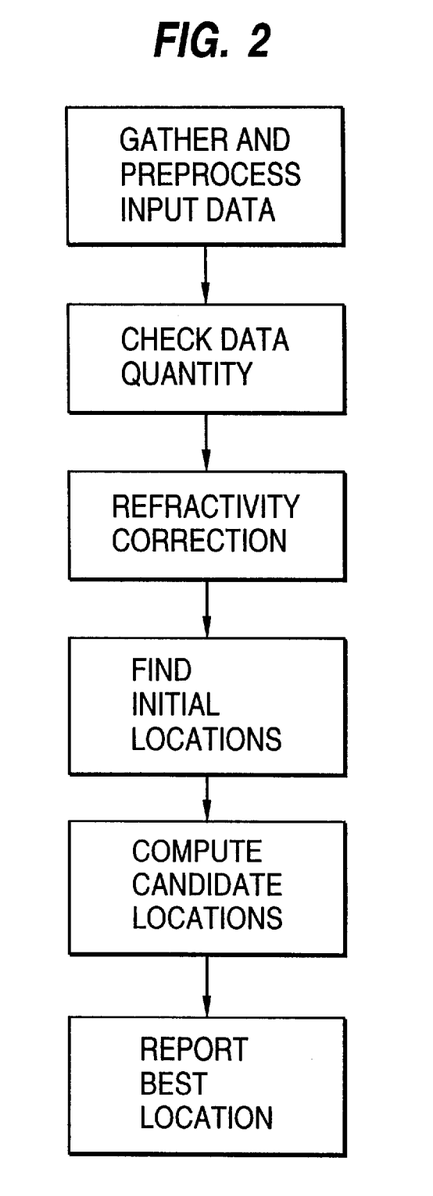

The flow chart shown in FIG. 2 illustrates the process carried out by the computer to estimate the transmitter's position and velocity from the received data. (Note: the term "location" will be used to mean "position and velocity".)

Figure 3:
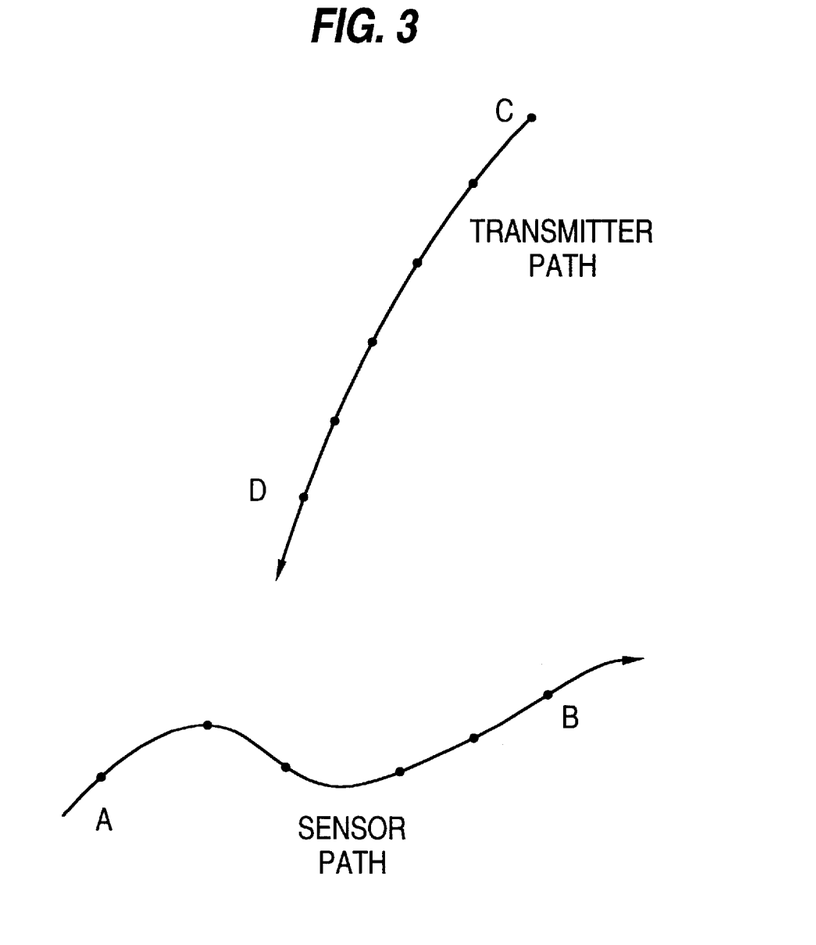
FIG. 3 is a diagram illustrating the measurement environment of the system.

As shown in FIG. 2, the first step of the algorithm is to gather and preprocess the input data as the platform travels on a measurement path as shown in FIG. 3. As the platform, or, more precisely, the antenna pair mounted on the platform, travels through a measurement path from point A to point B, radar pulses in clusters will be received from a transmitter as it travels from point C to point D. Each cluster will correspond to a different measurement point on the measurement path with the measurement points distributed over the measurement path from point A to point B. The measured points do not need to be uniformly distributed along the measurement path. Each measurement point on the sensor's path corresponds to a transmission point on the transmitter's path. The computer will receive digital values representing the amplitudes and phases of the samples of the pulse waveform. From these digital values, the computer determines a representative frequency and a representative phase difference for each measurement point corresponding to a cluster and assigns a navigation tag to each cluster. The navigation tag comprises data obtained from the inertial navigation system and will be the position of each antenna at each measurement point and the boresight direction of each antenna at each measurement point.

Following the step of gathering and preprocessing the data, as shown in FIG. 2, a check is made to determine whether or not sufficient data is present to make an accurate determination of the transmitter position. This check includes confirming that the number of clusters being processed exceeds a selected minimum, that the clusters were received over a time span that exceeds a selected minimum, and that the spacing between the clusters did not exceed a selected maximum. If the data quantity is insufficient as determined in this step, execution of the location determining algorithm is postponed until more clusters are obtained. A flow chart of this procedure is shown in FIG. 2A.

Following the step of checking the data quantity, the Z coordinate in the XYZ coordinate system describing the location of the sensor is corrected for refractivity, as shown in FIG. 2. Details of the refractivity correction are shown in the flow chart of FIG. 2B. After the refractivity correction, the process carries out the algorithm of locating the transmitter using the models of Equations (2) and (3) and a model for the transmitter's motion.

The initialization portion of the location determining algorithm shown in FIG. 2 performs two separate grid searches: one based on the frequency measurements and one based on the LBI phase difference measurements. The frequency-based grid search is performed over a region of the two bearing angles and over a few widely-spaced values of range. The bearing angles define the direction of the range vector in three dimensions. The region of bearing angles to be searched can be limited by considering the measured antenna boresights and the known antenna patterns. The phase-based grid search is performed over a region of the range and the two heading angles, which define the direction of motion of the transmitter in three dimensions; the region of heading angles to be searched can be limited by considering limitations due to the radiation patterns of typical transmitters of interest. The speed is initialized to some typical transmitter speed. The frequency $f_o$ is initialized to the average of the frequency measurements. The phase offset $\phi_o$ is initialized to zero. This procedure produces an initial location (position and velocity) to be refined using a nonlinear least squares algorithm. A second initial location is obtained from the most recently estimated location, if it exists and is not outdated.

Next, as shown in FIG. 2, a nonlinear least squares convergence is attempted from each initial location using the model of Equations (2) and (3) and some specified model for the transmitter's motion. If desired, a nonlinear least squares convergence can be attempted from each initial location using each of several transmitter motion models. After convergence, the best location is chosen by evaluating a cost function for each location and choosing the location having the lowest cost. The cost function is also based on the model of Equations (2) and (3) and the appropriate transmitter motion model. Following the cost function evaluation, the location having the lowest cost function is reported and displayed.

Figure 4:
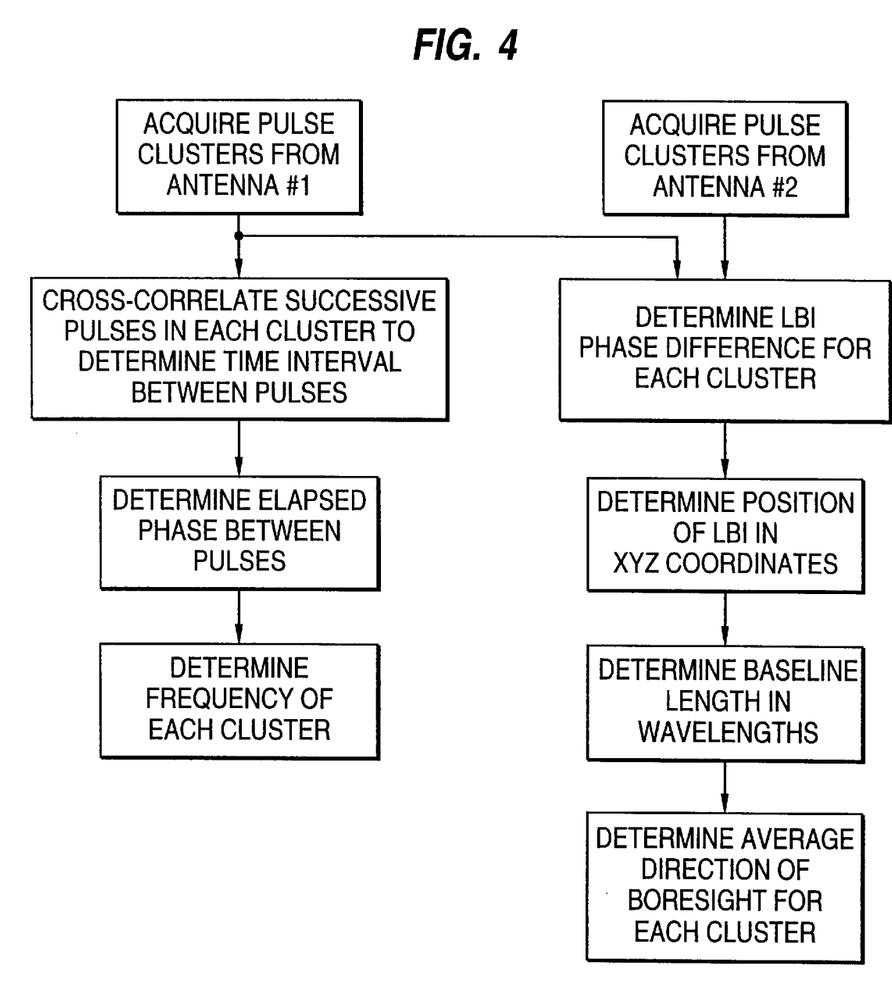
FIG. 4 is a flow chart illustrating the data acquisition portion of the computer program in more detail.

As shown in the flow chart of FIG. 4, in the preferred embodiment of the invention, the gather and preprocess data step involves acquiring a series of clusters of pulses detected by each antenna over a measurement interval during which the platform is moving through the measurement path. Each cluster comprises a series of coherent pulses received over a short time interval of a few milliseconds up to 100 milliseconds. The blocks on the left side of FIG. 4 show how frequency measurements are made, while the blocks on the right side of FIG. 4 show how LBI phase difference measurements are made.

The fact that the pulses are coherent means that each pulse starts at the same point in the carrier waveform cycle. Stated mathematically, coherency means that $$\frac{1}{T_n} = \frac{1}{N} f_o$$

in which $T_n$ is the elapsed time between the pulse samples and N is an integer. Navigation data provided by the inertial navigation system on the platform indicates the position of the platform and the attitude of the platform at the time the cluster is received or, more specifically, at a time reference assigned specifically to the cluster. From this navigation data, the location, velocity and boresight of the antenna is determined at the time of each measurement point corresponding to a cluster of pulses.

The A-to-D converters 19 and 21 provide the computer with a series of amplitude and phase waveform samples of each received IF signal during each pulse of each cluster. To obtain a frequency measurement for a cluster, the waveform of each pulse of the cluster is cross-correlated with the succeeding pulse in the cluster. The frequency to be measured is the carrier frequency of the pulse waveform, which is much higher than the pulse repetition frequency in the cluster. The cross-correlation function yields a set of cross-correlation values for different time displacements between the pulses and these sets of values will have a maximum at the time displacement $\Delta T$ equal to the actual time interval between successive pulses. More specifically, when the first pulse is cross-correlated with the second pulse, a value $\Delta T$ will be determined corresponding to the time interval between the start of the first pulse and the start of the second pulse. An indication of the elapsed phase or phase difference between the start of the first pulse and the start of the second pulse can be determined from the correlation function:

$$C_{12}(\Delta T) = A^2 e^{i\Delta\phi}, \tag{4}$$

in which $C_{12}(\Delta T)$ is the magnitude of the correlation function for the time displacement $\Delta T$ between the two pulses and $\Delta\phi$ represents the elapsed phase or phase difference between the two pulses. From Equation (4), an indication of the elapsed phase $\Delta\phi$ can be determined in modulo $2\pi$. If the elapsed phase were known completely, the frequency could be determined directly from the equation:

$$f = \frac{\Delta\phi}{2\pi\Delta T}. \tag{5}$$

In view of the fact that $\Delta\phi$ can be determined in modulo $2\pi$ from Equation (4), $\Delta\phi$ can be represented as follows:

$$\Delta\phi = \widetilde{\Delta\phi} + n2\pi \tag{6}$$

in which $\widetilde{\Delta\phi}$ represents the modulo $2\pi$ value of $\Delta\phi$ and n is an unknown integer. Accordingly, the frequency of the waveform of the pulses of the cluster can be represented as:

$$f = \frac{\widetilde{\Delta\phi} + n2\pi}{2\pi\Delta T} = \frac{\widetilde{\Delta\phi}}{2\pi\Delta T} + \frac{n}{\Delta T}. \tag{7}$$

Thus, the formula for frequency has an ambiguity of that is a multiple of $1/\Delta T$. In accordance with the invention, some of the ambiguity is resolved by using successive pairs of the pulses in the cluster to create a series of ambiguous expressions for the frequency as follows:

$$f = \frac{\widetilde{\Delta\phi_1} + n_1 2\pi}{2\pi\Delta T_1} = \frac{\widetilde{\Delta\phi_2} + n_2 2\pi}{2\pi\Delta T_2} = \ldots = \frac{\widetilde{\Delta\phi_k} + n_k 2\pi}{2\pi\Delta T_k}. \tag{8}$$

In Equation (8), the $\widetilde{\Delta\phi_1}$ through $\widetilde{\Delta\phi_k}$ represent the modulo $2\pi$ phase values determined from the cross correlation of each successive pair of pulses in the cluster, $\Delta T_1$ through $\Delta T_k$ are the time intervals between each successive pair of pulses in the cluster, and $n_1$ through $n_k$ are the corresponding unknown integers for each successive pair of pulses. Only some of the values $n_1$ through $n_k$ will satisfy Equation (8) and, accordingly, the ambiguity is reduced to a subset of $n_1$–$n_k$. To eliminate the remaining ambiguity, the slope of the phase change of each pulse is measured making use of the phase samples of the pulse waveform to provide a coarse estimate of the frequency. If the coarse estimate of the frequency is insufficiently accurate to resolve the remaining ambiguity, then one of the frequency solutions is arbitrarily selected as the frequency for the cluster and a corresponding frequency is selected for each of the clusters so that if one of the ambiguous frequencies is selected, the same corresponding ambiguous frequency will be selected for every cluster. The selected frequencies are then used in the transmitter location algorithm to determine the location of the transmitter. The algorithm will determine the correct location for the transmitter as long as all the frequencies correspond to the same ambiguity because the measurement of the transmitter location comes from the value of $\Delta f$, the Doppler change in frequency due to the relative motion between the platform and the transmitter, and this value will be the same for each corresponding set of the ambiguous frequencies. In fact, every ambiguous frequency represents an actual spectral component of the transmitted waveform.

The above system of determining the frequency lends itself to radar signal transmissions because the signal is transmitted in clusters of coherent pulses. The system can also be applied to a continuous signal transmission by acquiring clusters of coherent samples of the transmitted waveform and cross correlating the samples.

The frequency determined by the above-mentioned process for each of the clusters will be an intermediate frequency represented by the difference between the transmitter carrier frequency and the local oscillator frequency plus a Doppler shift frequency component.

The intermediate frequency measurements are corrected for variations in the local oscillator frequency caused by the local oscillator acceleration as indicated by the inertial guidance system. As a result of this correction, each frequency measurement will correspond to that which would be detected with a local oscillator that is insensitive to acceleration. This technique of frequency detection is disclosed in the above-mentioned copending application Ser. No. 08/731,193.

In the preferred embodiment of the invention, the frequency measurements used in the transmitter location algorithm are corrected intermediate frequencies, wherein the equation models (1) and (2) on which the algorithm is based express the frequency detected by the antenna. Since after correction for acceleration the intermediate frequency measurements have a constant offset from the frequencies detected by the antenna, the corrected intermediate frequency measurements can be used directly in the algorithm because the constant local oscillator offset cancels out.

FIG. 4 also illustrates the process of measuring the LBI phase differences between the signals received by antennas 13 and 15. To obtain a measurement of the phase difference between the signals received at each antenna for a cluster, the phase difference for each pulse of the cluster is determined and then the phase difference for the cluster is calculated from these phase differences as will be described below. Before making this calculation, the phase differences for the pulses in the cluster are unwrapped to accurately represent the relative phase difference throughout the cluster. It will be recalled that the phase difference measurements vary in accordance with the modulo $2\pi$ expression of Equation (3). Thus, as the phase difference changes from pulse to pulse over the cluster, it may abruptly change from a value near $2\pi$ to a value near zero or vice versa. The unwrapping eliminates this discontinuity in the data. To carry out the unwrapping, the value $2\pi$ is added or subtracted from the phase difference values so that the difference between successive phase differences from pulse to pulse within the cluster lies in the interval from $-\pi$ to $\pi$. After the phase unwrapping, the coefficients of a second order curve are determined by regression from the phase difference values of the cluster and then from the second order curve a phase difference for the cluster is determined to correspond with the phase difference at the time of the navigation tag assigned to the cluster. The method of phase detection is described in copending application Ser. No. 08/731,191. As shown in FIG. 4, in addition to determining the phase difference measurement for each cluster, the precise position of each antenna of the LBI is determined for each cluster from the navigation data determined by the inertial navigation system and assigned to the cluster as a navigation tag. The navigation data will provide the position of the force center of the platform at the time reference for the cluster. The position of each antenna in a common XYZ coordinate system is then determined for each of the two antennas of the LBI. The vector length of the baseline is then computed in wavelengths of the detected transmitter signal. In addition, the average direction of the antenna bore sight is calculated for each cluster.

As a result of the gather and process input data step detailed in FIG. 4, a series of phase difference measurements $\phi(1)$ through $\phi(N)$, one for each cluster, is determined; similarly, a series of frequency measurements $f(1)$ through $f(N)$, one for each cluster, is determined. These measurements are distributed over the measurement interval and distributed along the measurement path that the platform travels during the measurement interval. The gathering and process input data step of the specific embodiment described above involving processing clusters of pulses is not a necessary part of the invention. Instead, the phase differences and frequency could be simply directly measured at a series of incremental discrete points as the platform moves along the measurement path during the measurement interval.

The algorithm for determining the transmitter location from phase difference and frequency measurements determined at the measurement points distributed along the measurement path as described above resides in the block labeled "Compute Candidate Locations" in FIG. 2. As shown there, a nonlinear least squares iteration is performed to refine the initial location(s) into estimated location(s). A plurality of initial locations can be provided. For each provided initial location, a plurality of candidate estimated locations can be found. As shown in FIG. 2, the best (in the sense of lowest least squares cost) of these candidate estimated locations is reported. The details of this process are described below.

The least squares algorithm uses the signal models of $$f = f_o - \frac{f_o}{c} \left( \overline{\Delta V} \cdot \frac{\overline{r}}{|\overline{r}|} \right), \tag{9}$$

for the frequency measurements, and $$\phi = \left[ \phi_0 + \frac{2\pi L}{\lambda} \cos\theta_\phi \right] \mod 2\pi, \tag{10}$$

for the LBI phase difference measurements. As the sensor traverses some trajectory over the measurement interval T, extending from time $t_i$ to time $t_f$, it collects N frequency measurements $f(1), f(2), \ldots, f(N)$ and N phase difference measurements $\phi(1), \phi(2), \ldots, \phi(N)$. These measurements can be grouped into two measurement vectors:

$$\overline{f}_m = [f(1) f(2) \ldots f(N)]^T \tag{11}$$

and $$\overline{\phi} = [\phi(1) \phi(2) \ldots \phi(N)]^T. \tag{12}$$

Figure 5:
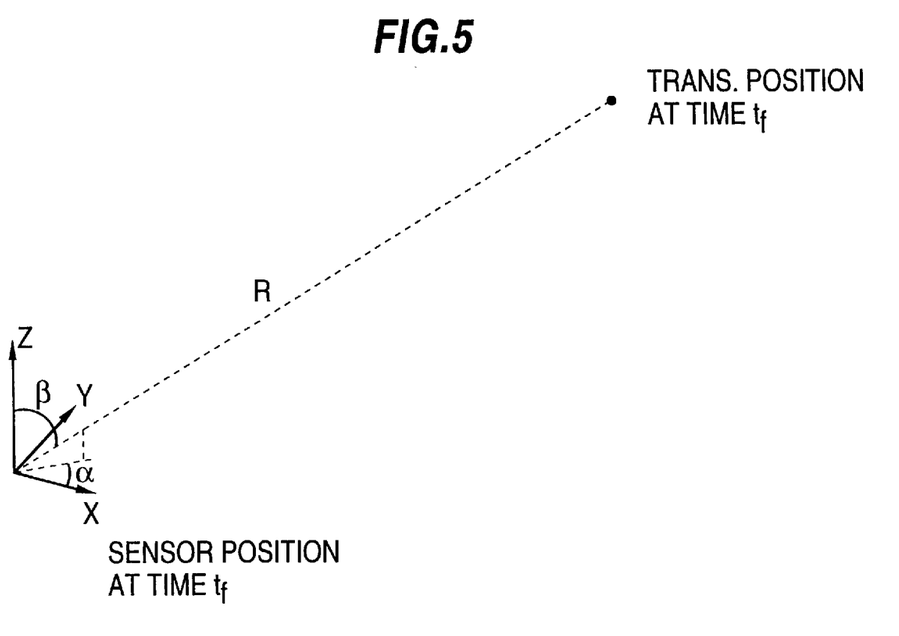
FIG. 5 is a diagram illustrating the polar coordinate system used for the transmitter's position.
Figure 6:
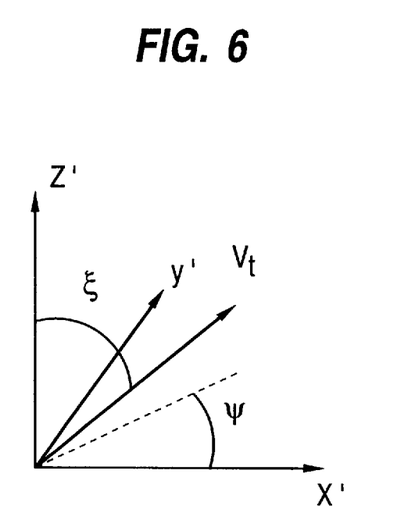
FIG. 6 is a diagram illustrating the polar coordinate system used for the transmitter's velocity.

Navigation information is also recorded at each measurement instant to provide precise information on the position and velocity of the sensor's antennas. Given these data, the location algorithm computes an estimate of the position and velocity of the transmitter at the time $t_1$; typically $t_1 = t_f$, as will be assumed throughout the sequel. In addition, the location algorithm estimates the transmitter's frequency $f_o$ and the LBI phase offset $\phi_o$. As shown in FIG. 5, the transmitter's position at the time $t_f$ can be described in terms of polar coordinates R, $\alpha$, and $\beta$ (range and two bearing angles) with respect to the sensor's position at time $t_f$. The XYZ coordinate system centered on the sensor can be chosen in any appropriate way (e.g., X axis points east, Y axis points north, etc.). The range R is the length of a line drawn between the sensor and the transmitter, the bearing angle $\alpha$ is the angle between the X axis and the projection of the range line onto the XY plane, and the bearing angle $\beta$ is the angle between the Z axis and the range line. As shown in FIG. 6, the transmitter's velocity at the time $t_f$ can be described in terms of polar coordinates S, $\psi$, and $\xi$ (speed and two heading angles). The X'Y'Z' coordinate system centered on the transmitter can be chosen in any appropriate way (e.g., X' axis points east, Y' axis points north, etc.). The speed S is the length of the velocity vector, the heading angle ψ is the angle between the X' axis and the projection of the velocity vector onto the X'Y' plane, and the heading angle ξ is the angle between the Z' axis and the velocity vector. These location parameters can be grouped with the transmitter's frequency $f_o$ and the LBI phase offset $\phi_o$ to form a parameter vector given by $$\bar{x}=[R\alpha\beta S\psi\xi f_o\phi_o]^T \tag{13}$$

The first six of these will be called the location parameters, while the last two will be called the nuisance parameters.

The algorithm makes use of some a priori model or models for the transmitter's motion; e.g., a constant velocity model, a constant acceleration model, etc. The model is used to relate the location parameters to be estimated, namely the transmitter's position and velocity at time $t_p$, to the transmitter's position and velocity throughout the observation interval T. For some models, the vector of parameters to be estimated must be augmented from that given above in Equation (13). For concreteness and simplicity a constant velocity model will be used for the remainder of this description.

Given a particular transmitter motion model, a current estimate of the transmitter's position and velocity at time $t_p$, and the positions and velocities of the antennas at the measurement instants, a prediction of the measured frequency and measured phase differences can be obtained by using this information in Equations (2) and (3). The accuracy of these predictions can be gauged by computing a corresponding cost function given by $$C = \bar{z}_\phi^T \Gamma_\phi^{-1} \bar{z}_\phi + \bar{z}_f^T \Gamma_f^{-1} \bar{z}_f \triangleq C_\phi + C_f, (C_\phi = \bar{z}^T \Gamma_\phi^{-1} \bar{z}_\phi \text{ and } C_f = \bar{z}_f^T \Gamma_f^{-1} \bar{z}_f) \tag{14}$$

where $\bar{z}_{100}=\bar{\phi}_m-\bar{\phi}_p$ difference between the measured phase differences $\bar{\phi}_m$ and the predicted phase differences $\bar{\phi}_p$, $\bar{z}_f= \bar{f}_m-\bar{f}_p$ is the difference between the measured frequency $\bar{f}_m$ and the predicted frequency $\bar{f}_p$, $\Gamma_\phi$ is the covariance matrix of the measurement errors in the phase difference measurements, and $\Gamma_f$ is the covariance matrix of the measurement errors in the frequency measurements. The covariance matrices may be diagonal matrices. A small value for C indicates a good estimate of the transmitter's location and the use of an appropriate model for it's motion.

Figure 7:
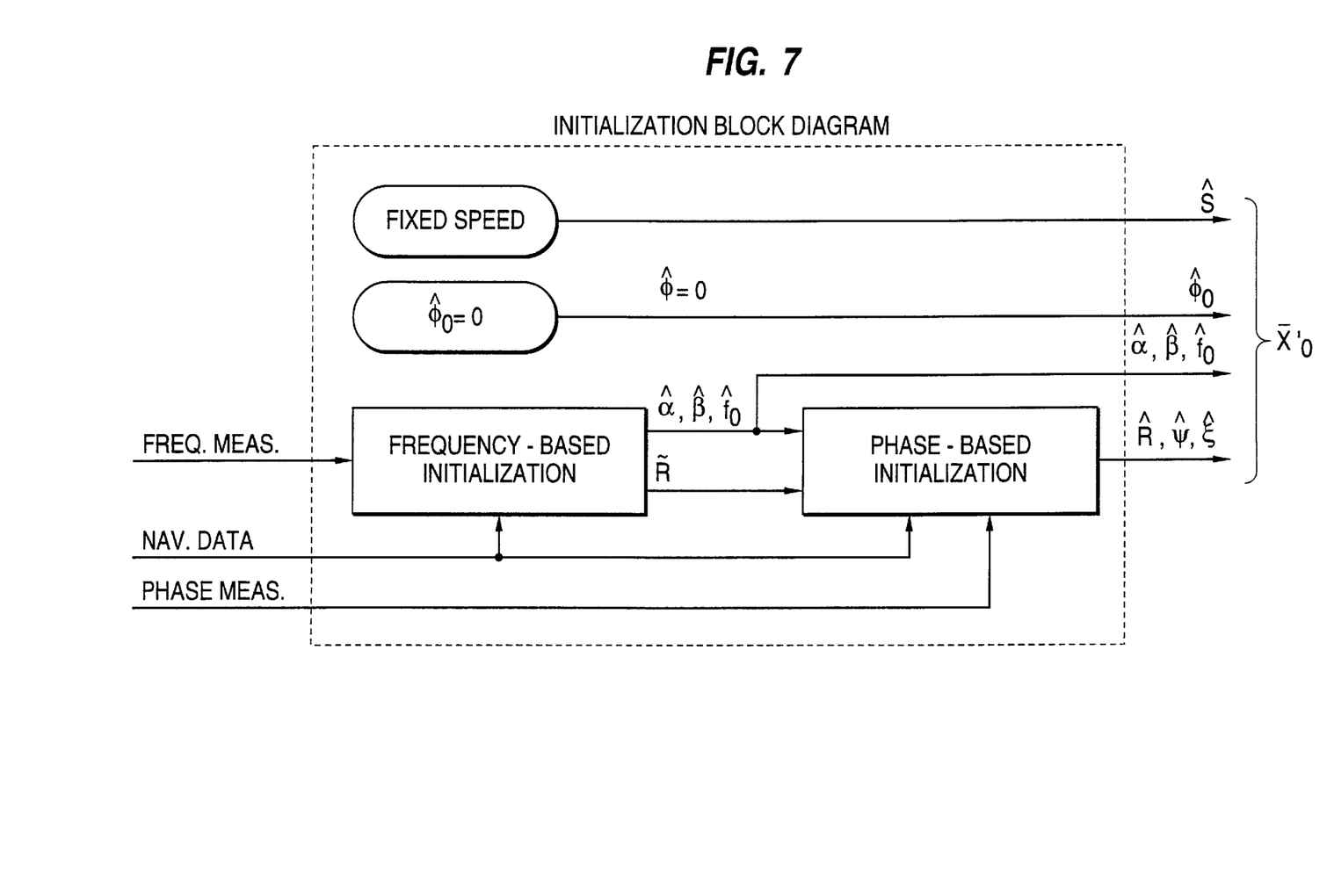
FIG. 7 is a block diagram of the initialization routine.

The initialization step represented in FIG. 2 comprises two parts: a frequency-based initialization and a phase-based initialization, as shown in FIG. 7. The frequency-based initialization uses the frequency measurements to arrive at initial estimates of the two bearing angles ($\hat{\alpha}$ and $\hat{\beta}$) and a rough initial value for the range ($\hat{R}$). The phase-based initialization uses the LBI phase difference measurements to arrive at a better initial estimate of the range ($\hat{R}$) and initial estimates of the two heading angles ($\hat{\psi}$ and $\hat{\xi}$). Each of these two initialization stages is based on a grid search to find the minimum of a cost function: the frequency-based grid search minimizes the cost function $C_f$ as defined in Equation (14), whereas the phase-based grid search minimizes the cost function $C_{100}$ as defined in Equation (14). The initial estimate of $f_o$ is set to the average of the measured frequencies over the measurement path, as described below. The initial estimate of the transmitter's speed is set to some typical value appropriate for the class of vehicles upon which the transmitter is expected to be mounted. The initial estimate of $\phi_o$ is set to zero.

For the frequency-based initialization, the first insight is that if all the parameters to be estimated except the carrier frequency are held fixed, the least squares estimate of the carrier frequency is linear and can be easily computed; in fact this linear least squares estimate is approximately equal to, and can be replaced by, the average of the frequency measurements. Thus, for each 7-dimensional grid search point defined by fixed values of range, two bearing angles, speed, two heading angles, and LBI phase offset, the least squares estimated carrier frequency can be computed (rather than searched for); this reduces the grid search to 7 dimensions. The second insight is that the least squares cost function $C_f$ for the frequency measurements is highly insensitive to the grid values of speed and doesn't depend at all on the LBI phase offset (in other words, the function is essentially constant along these two axes of the seven dimensional grid); thus, the search can be reduced to searching over only five parameters: range, the two bearing angles, and the two heading angles. The third insight is that for a specific pair of bearing angles, the transmitter's heading angles are constrained by the transmitter's "look angles"; in other words, the transmitter is limited in where it can point and this limits the region of possible heading angles. Furthermore, the cost function $C_f$ doesn't vary much over this region of geometrically-limited heading angles, so we can limit our search to only one pair of heading angles in this range (typically chosen to be defined by the vector pointing in the direction opposite to the vector defined by the two bearing angles being searched); this reduces the search to only three parameters: range, and the two bearing angles. The search over the two bearing angles can be limited to a region limited by knowledge of the measured boresights of the antenna for each received cluster and the known antenna patterns. Finally, the least squares cost function $C_f$ for the frequency measurements is somewhat insensitive to the grid value of range (in other words, the function is fairly constant along this axis). Therefore, only a few values of range must be searched. Thus, by performing a limited three-dimensional grid search, the frequency-based initialization provides initial estimates for the two bearing angles and the carrier frequency $f_o$, and it provides a rough initial estimate of the range.

For the phase-based initialization, frequency-based estimates of the two bearing angles by the grid search described above and an estimate of the carrier frequency have already been found, so this reduces the required phase-based search to a search over five parameters: range, two heading angles, transmitter speed, and LBI phase offset. By using the time-to-time differences of the LBI phase difference measurements, the dependence on the phase offset is removed; this reduces the phase-based grid search to four parameters: range, two heading angles, and speed. The cost function used for this is $$C_{\Delta\phi}=\overline{\Delta z}_{100}^T \Gamma_{100}^{-1} \overline{\Delta z}_{100} \tag{15}$$

where $\overline{\Delta z}_{100}$ is the vector whose $n^{th}$ element is given by $\Delta z_{100}(n)=z_{100}(n+1)-z_{100}(n)$. Finally, the least squares cost function $C_{\Delta\phi}$ for the differential LBI measurements is insensitive to the grid value of the transmitter's speed (as was the case for the frequency cost function), so no search is needed over that parameter; this reduces the phase-based grid search to three parameters: range and two heading angles. Furthermore, the region of heading angles that needs to be searched is reduced by geometrical limitations as discussed above, and the region of ranges that needs to be searched is reduced due to the rough range estimate obtained through the frequency-based initialization. Thus, by performing a limited three-dimensional grid search, the phase-based initialization provides initial estimates for the two heading angles and the range. A flow chart of the initialization procedure is shown in FIG. 7A. FIG. 7B illustrates the details of the 3-D grid search for the frequency-based initialization and FIG. 7C illustrates the details of the 3-D grid search of the phase-based initialization.

The above insights drastically reduce the computational complexity of the initialization grid search and make the algorithm viable for real-time implementation. These efficient grid searches quickly provide an initial estimate for the location and nuisance parameters that can be refined using an iterative nonlinear least squares algorithm. The initial estimate is called $\bar{x}'_0$.

Figure 8:
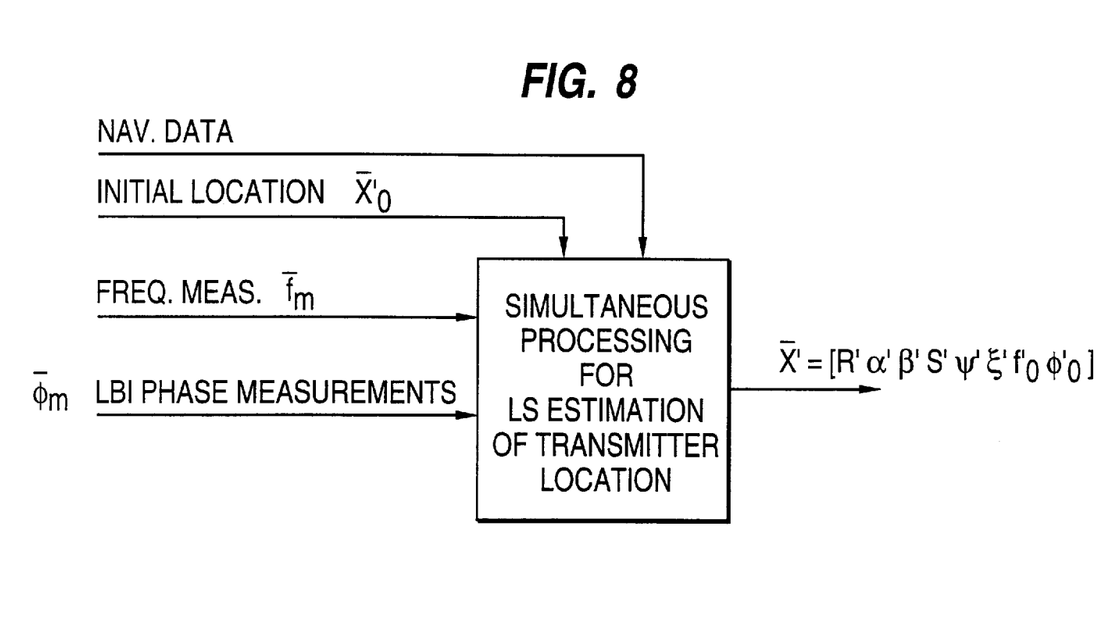
FIG. 8 is a block diagram of the simultaneous mode of processing.
Figure 9:
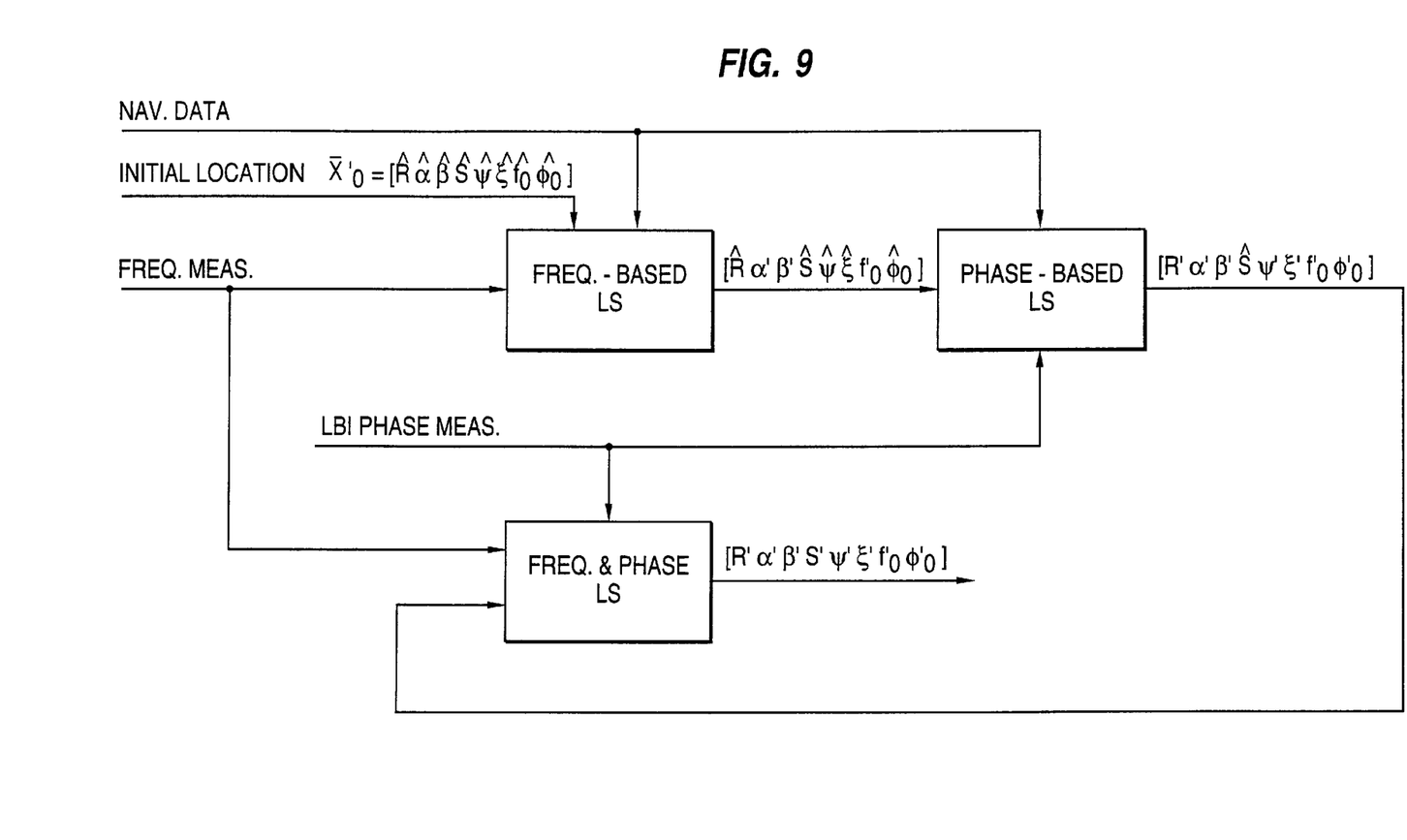
FIG. 9 is a block diagram of the sequential mode of processing.

The nonlinear least squares algorithm can operate in two modes: simultaneous processing and sequential processing. In simultaneous processing, as shown in FIG. 8, the frequency measurements and the LBI phase difference measurements are operated on simultaneously. In sequential processing, as shown in FIG. 9, the frequency measurements and the LBI phase difference measurements are operated on sequentially: first the frequency measurements are used to estimate the two bearing angles, then the LBI phase difference measurements are used to estimate the two heading angles and the range, then the frequency and phase measurements are used together to estimate the transmitter's speed.

In the simultaneous processing mode, the measurement vectors $\bar{f}_m$ and $\bar{\phi}_m$ are stacked to form a composite measurement vector $\bar{y}_m$ given by $$\bar{y}_m = \begin{bmatrix} \bar{f}_m \\ \bar{\phi}_m \end{bmatrix}. \tag{16}$$

The predicted measurement vectors, based on some current (possibly the initial) estimate $\bar{x}'_n$ of $\bar{x}$, are also stacked to form a composite prediction vector $\bar{y}_p$ given by $$\bar{y}_p = \begin{bmatrix} \bar{f}_p \\ \bar{\phi}_p \end{bmatrix}. \tag{17}$$

The Jacobian of the frequency measurement model (Equation 9) is computed for each measurement time according to $$H_f = \frac{\partial}{\partial \bar{x}} f(\bar{x}) \Big|_{\bar{x}'}, \tag{18}$$

where the partial derivative with respect to the vector $\bar{x}$ is defined by $$\frac{\partial}{\partial \bar{x}} f(\bar{x}) = \tag{19}$$

$$\left[ \frac{\partial}{\partial R} f(\bar{x}) \frac{\partial}{\partial \alpha} f(\bar{x}) \frac{\partial}{\partial \beta} f(\bar{x}) \ldots \frac{\partial}{\partial f_o} f(\bar{x}) \frac{\partial}{\partial \phi_o} f(\bar{x}) \right]^T$$

$$H_\phi = \frac{\partial}{\partial \bar{x}} \phi(\bar{x}) \Big|_{\bar{x}'}, \tag{20}$$

The Jacobian $H_f$ is an N×8 matrix that is computed using the assumed target motion model, the navigation information, and the current estimate $\bar{x}'_n$. Note that the last column of $H_f$ contains all zeros. Similarly, the Jacobian of the phase difference measurement model (Equation 10) is computed for each measurement time according to where the partial derivative with respect to the vector $\bar{x}$ is defined by $$\frac{\partial}{\partial \bar{x}} \phi(\bar{x}) = \tag{21}$$

$$\left[ \frac{\partial}{\partial R} \phi(\bar{x}) \frac{\partial}{\partial \alpha} \phi(\bar{x}) \frac{\partial}{\partial \beta} \phi(\bar{x}) \ldots \frac{\partial}{\partial f_o} \phi(\bar{x}) \frac{\partial}{\partial \phi_o} \phi(\bar{x}) \right]^T$$

The Jacobian $H_\phi$ is an N×8 matrix that is computed using the assumed target motion model, the navigation information, and the current estimate $\bar{x}'_n$. The Jacobian for the composite measurements is given by $$H_y = \begin{bmatrix} H_f \\ H_\phi \end{bmatrix}, \tag{22}$$

which is a 2N×8 matrix. The covariance of the composite measurement errors is given by $$\Gamma_y = \begin{bmatrix} \Gamma_f & 0 \\ 0 & \Gamma_\phi \end{bmatrix}, \tag{23}$$

where 0 is an N×N matrix of zeros. Define the matrix A as follows:

$$A = H_y^T \Gamma^{-1} H_y \tag{24}$$

and from it define the modified matrix $\hat{A}$ by replacing each diagonal element $a_{jj}$ of A with $(1+\lambda)a_{jj}$ for some $\lambda \geq 0$; the choice of $\lambda$ will be discussed below.

The nonlinear least squares iteration is represented as $$\bar{x}'_{n+1} = \bar{x}'_n + \overline{\Delta x} \tag{25}$$

where $\overline{\Delta x}$ represents a vector of corrections to be applied to the current estimate $\bar{x}'_n$, and is determined to be the solution to the equation:

$$\hat{A} \overline{\Delta x} = (H_y^T \Gamma_y^{-1}) \bar{z}_y, \tag{26}$$

where $\bar{z}_y = \bar{y}_m - \bar{y}_p$ is the difference between the composite measurements and the predictions of the composite measurements. One simple way to solve Equation (26) is by direct inversion:

$$\overline{\Delta x} = \hat{A}^{-1} (H_y^T \Gamma_y^{-1}) \bar{z}_y \tag{27}$$

Other, more numerically robust, methods of solving Equation (26) include the use of the QR decomposition or the singular value decomposition (SVD). After the initial estimate $\bar{x}'_0$, has been corrected to yield $\bar{x}'_1$, the process is repeated until the iteration in Equation (25) converges. This process results in an estimate of the range, the two bearing angles, the speed, the two heading angles, and the transmitting frequency of the transmitter.

Figure 10:
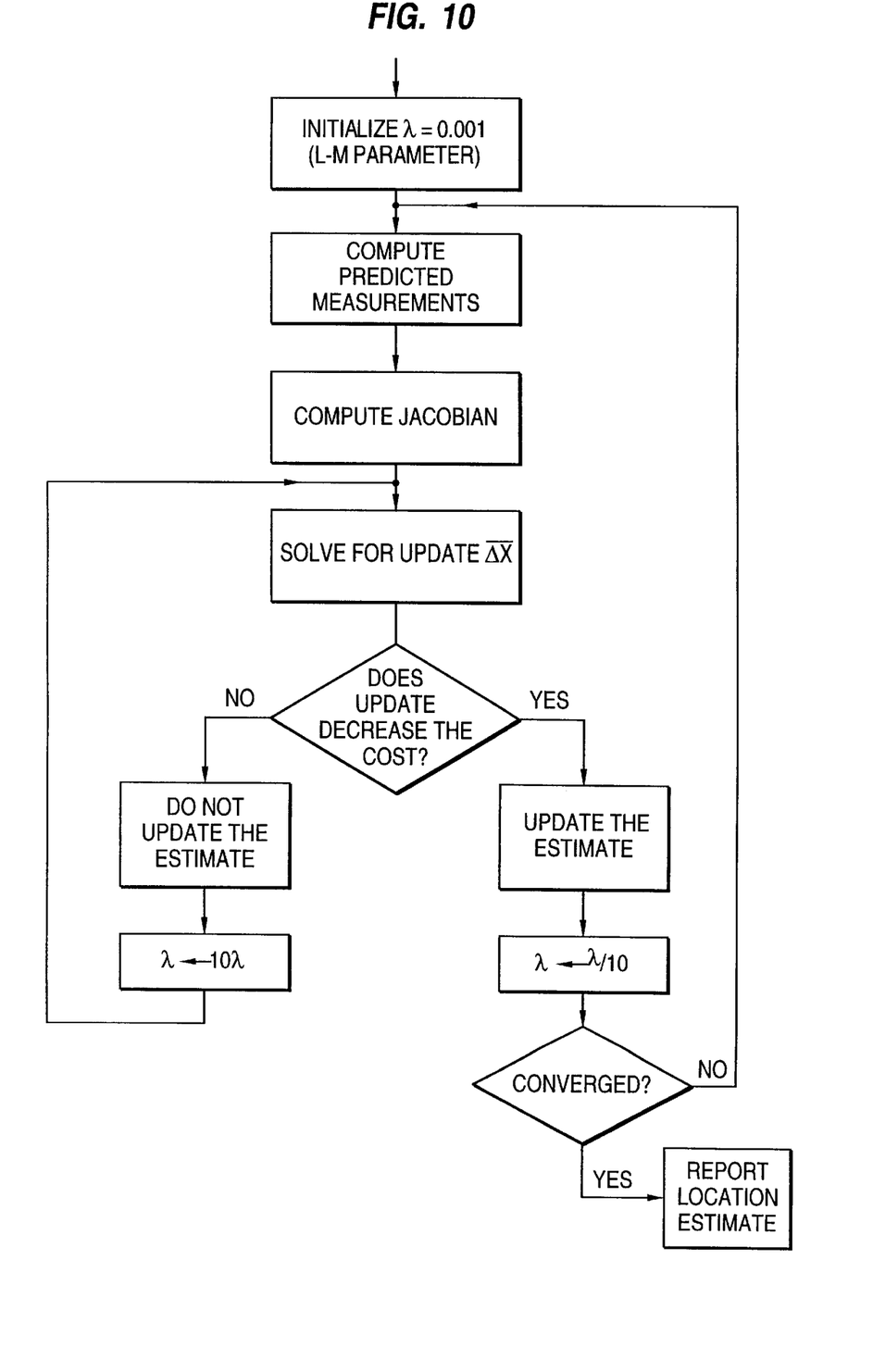
FIG. 10 is a flow chart illustrating the nonlinear least squares iteration.

The procedure for selecting an appropriate value for $\lambda$ in defining the matrix $\hat{A}$ is shown in FIG. 10, and is known in the numerical analysis literature as the Levenberg-Marquardt (LM) method. At the start of the LM routine the value of $\lambda$ is initialized to a small value; a typical value is 0.001. Next, the current (or initial) estimate is used, together with the assumed transmitter motion model, in Equations (2) and (3) to compute the predicted composite measurements at the same time instant that the real measurements were taken. Then, using the current estimate, the navigation data, and the transmitter motion model, the Jacobian $H_y$ of the composite measurements is computed using Equations (18), (20), and (22). This Jacobian is then used to compute the matrix $\hat{A}$, which is then used, together with the Jacobian $H_y$ and $\bar{z}_y$, to solve Equation (26) for the update $\overline{\Delta x}$. Next the update is tentatively added to the current estimate to create a test estimate, according to:

$$\bar{x}'_{test} = \bar{x}'_n + \overline{\Delta x} \qquad (28)$$

The least squares cost $C_{test}$ associated with the test estimate $\bar{x}'_{test}$ is then computed and compared to the least squares cost $C$ associated with the current estimate $\bar{x}'_n$. If $C_{test} < C$, then the test estimate is accepted as the next estimate ($\bar{x}'_{n+1} = \bar{x}'_{test}$) and the current value of $\lambda$ is decreased by a factor of 10 ($\lambda \leftarrow \lambda/10$); if the calculation represented by Equation 28 is not converged, the routine loops back to the top of FIG. 10; if it is converged the updated estimate is provided as a candidate location estimate. If on the other hand $C_{test} \geq C$, then the test estimate is rejected as the next estimate, the current value of $\lambda$ is increased by a factor of 10 ($\lambda \leftarrow 10\lambda$), and another update is computed and tested.

An alternative method for the simultaneous processing mode that reduces the time to convergence is as follows. The composite Jacobian $H_y$ is replaced by the 2N×7 matrix formed by removing the fourth column (corresponding to speed S) from $H_y$. Similarly, the speed (S) variable is removed from the vector of parameters to be estimated. The nonlinear least squares convergence procedure shown in FIG. 10 is then performed while holding the value of S fixed at the initial value. If, after convergence, it is desired to estimate S, a single-variable nonlinear least squares iteration can be performed using the frequency and phase difference measurements, while holding the values of R, $\alpha$, $\beta$, $\psi$, $\xi$, $f_o$, and $\phi_o$ fixed at the values found by iterating with S held fixed.

In the sequential processing mode shown in FIG. 9, three sequential nonlinear least squares solutions are performed. After the initialization procedure provides the initial estimate $\bar{x}'_n$, a reduced-order least squares iteration following the steps outlined in FIG. 10 is performed using only the frequency measurements. The Jacobian used in this first stage is the frequency Jacobian $H_f$ as defined in Equation (18) with all but the first, second and third columns removed. Similarly, the vector of parameters to be estimated is replaced by the 3-D vector of the two bearing angles ($\alpha$ and $\beta$) and the emitted frequency $f_o$. Also, the cost to be considered here is $C_f$ as defined in Equation (14). While holding all other parameters fixed, a nonlinear least squares convergence as described in FIG. 10 is performed. The result is an estimate of the two bearing angles $\alpha$ and $\beta$ and the transmitter's frequency $f_o$. These are then provided (together with the initialization-derived estimates of R, $\psi$, and $\xi$, and the a priori fixed values for $\phi_o$ and S) to a phase-based nonlinear least squares iteration routine. The cost to be considered here is $C_{100}$ as defined in Equation (14). This least squares iteration is performed following the steps shown in FIG. 10 using a column-depleted version of the phase difference Jacobian $H_{100}$ found by removing all of its columns except those corresponding to R, $\psi$, $\xi$, and $\phi_o$. Holding all the other variables fixed, a nonlinear least squares iteration is performed to arrive at estimates for R, $\psi$, $\xi$, and $\phi_o$. Finally, as was done in the alternate version of the simultaneous processing mode, we do a final single-variable nonlinear least squares iteration (using frequency and phase measurements) to compute an estimate of the transmitter's speed.

Figure 11:
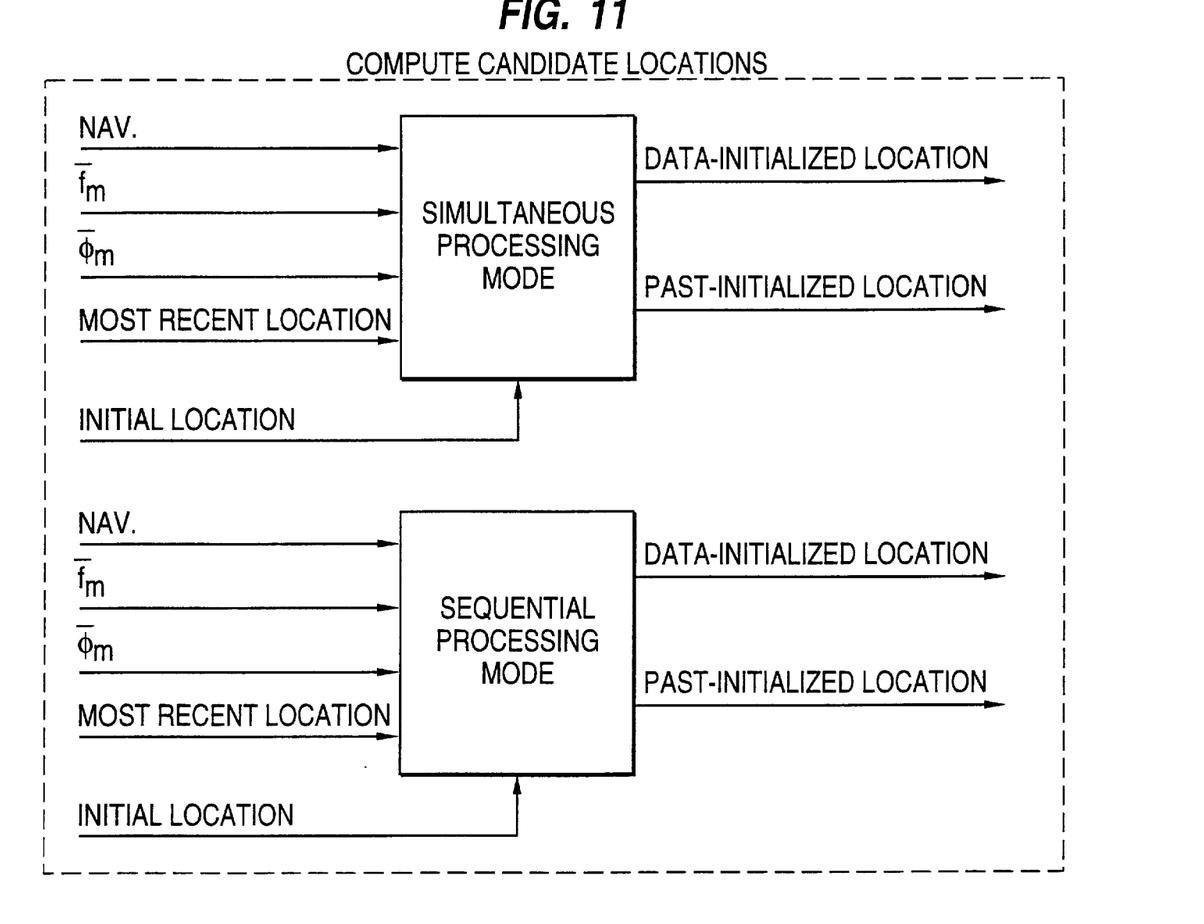
FIG. 11 is a block diagram showing the general structure of the compute candidate locations portion of the computer program in more detail.

If desired, it is possible to run the simultaneous processing mode and sequential processing mode concurrently and choose the better solution of the two modes on the basis of cost. FIG. 11 shows the most general processing structure within the "Compute Candidate Locations" box shown in FIG. 2. There are two main parts in this diagram: one for the simultaneous processing mode and one for sequential processing mode. Each of these modes is provided with the current batch of measurements, the corresponding navigation information, the most recent location (if one exists and is not outdated), and the initial location determined by applying the initialization routine to the current batch of data. Each of the two modes can produce up to two solutions: a data-initialized location using the initialization schemes described above and a past-initialized location using the most recent location (if it exists and is not outdated). The four resulting candidate location estimates are compared on the basis of cost and the lowest cost location estimate is reported. If two or more candidate location estimates have nearly equal cost, and are not collocated, this means that the best solution determined by the cost evaluation is ambiguous and it is reported and displayed, but the ambiguity is indicated.

The description given above has focused on the case where a single model for transmitter motion is assumed. It is possible to handle multiple models. One way to handle M models is to simultaneously compute M estimates, each one based on one of the M models, and select the one estimate among these M estimates that has the lowest cost; if two or more models tie for having the lowest cost, the simplest model is chosen. Another way is to use the models sequentially. Starting with the simplest model (e.g., constant velocity), solve for the resulting estimate; if the corresponding cost is below a specified threshold, stop and report that estimated location; if it is not, solve for the estimate based on the next model, etc. This method generally requires fewer computations than the first method.

The description provided above defined the position of the transmitter in terms of its range and two bearing angles as shown in FIG. 5, and defined the velocity of the transmitter in terms of its speed and two heading angles as shown in FIG. 6. However, the solution method described is not limited to this choice of coordinate system, but rather can be couched in terms of any equivalent coordinate system: the position could be specified in terms of an XYZ coordinate, the velocity could be expressed in terms of a range rate and two bearing angle rates, etc.

I claim:

1. A method of estimating the position and heading of a transmitter, comprising moving a platform having an LBI signal sensor through a measurement path, detecting the frequency sensed by an antenna on said platform at measurement points distributed along said measurement path, detecting the LBI phase differences detected by said LBI sensor at measurement points distributed along said measurement path, and estimating the position and heading of said transmitter from the frequency and LBI phase measurements in accordance with equation models:

$$f = f_o - \frac{f_o}{c}\left(\overline{\Delta V} \cdot \frac{\bar{r}}{|\bar{r}|}\right),$$

$$\phi = \left[\phi_o + \frac{2\pi L}{\lambda}\cos\theta_\phi\right] \bmod 2\pi$$

in which f is the frequency received by an antenna on said platform, $f_o$ is the frequency of the signal transmitted by said transmitter, c is the transmission velocity of the signal in the medium between said transmitter and said platform, $\Delta V$ is the vector difference between the velocities of said transmitter and said platform, $\bar{r}$ is the range vector, $\phi$ is the LBI phase difference measurements, $\phi_o$ is the LBI sensor phase offset, L is the length of the base line of the LBI sensor, $\lambda$ is the wavelength of the transmitted signal, $\theta_\phi$ is the angle of arrival of the transmitted signal to the LBI base line.

2. A method as recited in claim 1, wherein said position and heading of said transmitter are estimated by nonlinear least squares.

3. A method as recited in claim 1, wherein said nonlinear least squares is computed in accordance with successive iterations of the equation:

$$\bar{x}'_{n+1} = \bar{x}'_n + \overline{\Delta x'}$$

in which $\bar{x}'_n$ is a vector of the parameters defining the position and heading of said transmitter, and wherein $\Delta x$ is determined from partial derivatives of said parameters computed from said equation models.

4. A method as recited in claim 2, wherein said nonlinear least squares is used to simultaneously estimate the parameters defining the position and heading of said transmitter simultaneously from the frequency and LBI phase difference measurements.

5. A method as recited in claim 4, wherein the speed of said transmitter is also estimated simultaneously with the estimation of the parameters defining the position and heading of said transmitter in said nonlinear least squares computation from said frequency and LBI phase measurements.

6. A method as recited in claim 5, wherein the speed of said transmitter is estimated by nonlinear least squares after the estimation of the parameters defining the position and heading of said transmitter.

7. A method as recited in claim 2, wherein said nonlinear least squares calculation first estimates the bearing from said frequency measurements, then the heading and range are estimated from said LBI phase measurements followed by the estimation of the speed of the transmitter.

8. A method as recited in claim 2, wherein the estimation of the parameters of the position of the target are determined simultaneously by said nonlinear least squares calculation and wherein the bearing and the heading of said target are also determined in sequence to provide two separate estimates of the target position.

9. A method as recited in claim 2, further comprising estimating the speed of said transmitter from said frequency and LBI phase measurements in accordance with said equation models.

10. A method as recited in claim 2, further comprising making an initial estimate of the bearing from the frequency measurements by means of a first grid search wherein the equation model $$f = f_o - \frac{f_o}{c} \left( \overline{\Delta V} \cdot \frac{\bar{r}}{|\bar{r}|} \right)$$

is used to evaluate the cost of each grid point of said grid search, and making an initial estimate of the heading of said transmitter from said LBI phase measurements by means of a second grid search wherein the equation model $$\phi = \left[ \phi_o + \frac{2\pi L}{\lambda} \cos\theta_\phi \right] \mod 2\pi,$$

is used to evaluate the cost of each grid point of said grid search, said bearing and said heading being used as the initial values in said nonlinear least squares computation.

11. A method as recited in claim 10, wherein said first grid search also determines a coarse initial estimate of the range and said second grid search determines a more accurate initial estimate of the range, said second grid search, conducting said grid search through range limits set in accordance with said coarse initial estimate, said more accurate estimate of said range being used as an initial value in said nonlinear least squares computation.

\* \* \* \* \*